(12) United States Patent
Yan (10) Patent No.: US 11,656,901 B2
(45) Date of Patent: May 23, 2023

(54) CPU RESOURCE RESERVATION METHOD AND APPARATUS, AND RELATED DEVICE THEREOF

(71) Applicant: INSPUR ELECTRONIC INFORMATION INDUSTRY CO., LTD., Shandong (CN)

(72) Inventor: Bingheng Yan, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 0 days.

(21) Appl. No.: 17/779,764

(22) PCT Filed: Aug. 19, 2020

(86) PCT No.: PCT/CN2020/109935
§ 371 (c)(1),
(2) Date: May 25, 2022

(87) PCT Pub. No.: WO2021/135263
PCT Pub. Date: Jul. 8, 2021

(65) Prior Publication Data
US 2023/0004416 A1 Jan. 5, 2023

(30) Foreign Application Priority Data
Dec. 30, 2019 (CN) .......................... 201911403018.5

(51) Int. Cl.
*G06F 9/455* (2018.01)
*G06F 9/50* (2006.01)

(52) U.S. Cl.
CPC ............ *G06F 9/45558* (2013.01); *G06F 9/50* (2013.01); *G06F 9/5005* (2013.01); *G06F 9/505* (2013.01);
(Continued)

(58) Field of Classification Search
CPC ......... G06F 9/45558; G06F 2009/4557; G06F 9/5055; G06F 9/5027; G06F 9/505; G06F 9/5083; G06F 9/50; G06F 9/5005
See application file for complete search history.

(56) References Cited

U.S. PATENT DOCUMENTS

2015/0286494 A1 10/2015 Yan
2016/0179560 A1* 6/2016 Ganguli ................ G06F 9/5072
                                                                   718/1
(Continued)

FOREIGN PATENT DOCUMENTS

CN 103336722 A 10/2013
CN 106775921 A 5/2017
(Continued)

OTHER PUBLICATIONS

Ha et al., "Resource Management for Parallel Processing Frameworks with Load Awareness at Worker Side", IEEE, 2017, pp. 161-168. (Year: 2017).*
(Continued)

*Primary Examiner* — Kenneth Tang
(74) *Attorney, Agent, or Firm* — Cooper Legal Group, LLC (57) ABSTRACT

Provided are a Central Processing Unit (CPU) resource reservation method, apparatus, and device, and a computer-readable memory medium. The method includes: selecting a target working node according to a received Virtual Machine (VM) startup request; obtaining a total number of virtual cores and a number of allocatable physical cores in the target working node statistically; performing calculation to obtain an available CPU quota according to the total number of virtual cores and the number of allocatable physical cores; and performing CPU resource reservation configuration on the target working node by use of the available CPU quota. According to the CPU resource reservation method, the
(Continued)

reservation of CPU resources in a VM system may be implemented more flexibly and efficiently.

20 Claims, 2 Drawing Sheets

(52) U.S. Cl.
CPC .......... *G06F 9/5027* (2013.01); *G06F 9/5055* (2013.01); *G06F 9/5083* (2013.01); *G06F 2009/4557* (2013.01)

(56) References Cited

U.S. PATENT DOCUMENTS

| | | | |
|---|---|---|---|
| 2016/0239331 A1* | 8/2016 | Tamura | .................... G06F 9/50 |
| 2018/0101486 A1 | 4/2018 | Lu et al. | |
| 2020/0012523 A1* | 1/2020 | Kumar | ................ G06F 11/3428 |
| 2021/0004250 A1* | 1/2021 | Arya | .................... G06F 9/5072 |
| 2021/0064429 A1* | 3/2021 | Stetter, Jr. | ............... G06F 9/505 |
| 2022/0197773 A1* | 6/2022 | Butler | .................. H04N 21/234 |

FOREIGN PATENT DOCUMENTS

| | | | | | |
|---|---|---|---|---|---|
| CN | 107045468 | A | | 8/2017 | |
| CN | 108762935 | A | | 11/2018 | |
| CN | 108874534 | A | | 11/2018 | |
| CN | 110442423 | A | | 11/2019 | |
| CN | 111124687 | A | * | 5/2020 | ......... G06F 9/45558 |
| CN | 111124687 | A | | 5/2020 | |
| CN | 108279979 | B | * | 2/2021 | ........... G06F 9/5027 |

OTHER PUBLICATIONS

International Search Report of corresponding PCT application PCT/CN2020/109935, dated Oct. 28, 2020, 5 pages.
Written Opinion of International Searching Authority of corresponding PCT application PCT/CN2020/109935, dated Oct. 28, 2020, 8 pages.
Wang, et al., "Research on resource reservation algorithm to improve real-time performance of power cloud business",Electronic Technology Application, 2016, full text with English abstract, 5 pages.
Kwonyong Lee et al. "A CPU Overhead-Aware VM Placement Algorithm for Network Bandwidth Guarantee in Virtualized DataCenters", 2015 International Conference on Cloud and Autonomic Computing, 2015, full text, 7 pages.

* cited by examiner

CPU RESOURCE RESERVATION METHOD AND APPARATUS, AND RELATED DEVICE THEREOF

CROSS-REFERENCE TO RELATED APPLICATION

The present application claims priority to China Patent Application No. 201911403018.5, filed to the Patent Office of the People's Republic of China on Dec. 30, 2019, and entitled "CPU Resource Reservation Method and Apparatus, and Related Device Thereof", the contents of which are hereby incorporated by reference in its entirety.

TECHNICAL FIELD

The present application relates to the technical field of Virtual Machines (VMs), and particularly to a Central Processing Unit (CPU) resource reservation method, as well as a CPU resource reservation apparatus and device, and a computer-readable memory medium.

BACKGROUND ART

As an important service mode of cloud computing, Infrastructure as a Service (IaaS) is a main form of a public cloud and a private cloud nowadays, which implements service encapsulation of computing, storage and network resources and other basic resources, and provides VMs to complete the supply and delivery of the resources. A VM is a main resource carrier for customer service, and each performance index thereof is quite important to the customer service, wherein the CPU computing performance is the most important. Therefore, certain CPU resources are usually needed to be reserved for VMs disposing important services to ensure the operation of key VMs.

In the prior art, CPU resources are usually reserved by CPU binding. However, in this implementation mode, after CPU binding is completed, a bound CPU is only allowed to be used by a corresponding VM, and cannot be used effectively by other VMs. Therefore, it is necessary to perform CPU binding for each VM to implement CPU resource reservation, which increases the complexity of a CPU resource reservation mechanism and makes the flexibility relatively low.

Therefore, how to implement the effective reservation of CPU resources in a VM system flexibly is a problem urgent to be solved by those skilled in the art.

SUMMARY OF THE INVENTION

An objective of the present application is to provide a CPU resource reservation method, which may implement the reservation of CPU resources in a VM system more flexibly and efficiently. Another objective of the present application is to provide a CPU resource reservation apparatus, system, and device, and a computer-readable memory medium, which also have the above-mentioned beneficial effect.

In order to solve the foregoing technical problem, the present application provides a CPU resource reservation method, including:
selecting a target working node according to a received VM startup request;
obtaining a total number of virtual cores and a number of allocatable physical cores in the target working node statistically;
performing calculation to obtain an available CPU quota according to the total number of virtual cores and the number of allocatable physical cores; and
performing CPU resource reservation configuration on the target working node by use of the available CPU quota.

Preferably, the selecting a target working node according to a received VM startup request includes:
calling a preset node selection strategy in case that the VM startup request is received; and
selecting the target working node from all working nodes according to the preset node selection strategy.

Preferably, the preset node selection strategy is a load balancing strategy.

Preferably, before the selecting the target working node from all working nodes according to the preset node selection strategy, the method further includes:
sequencing each working node according to a sequence from low to high CPU usages.

Preferably, the obtaining a total number of virtual cores in the target working node statistically includes:
determining an operating VM in operation in the target working node;
obtaining a number of virtual cores of each operating VM statistically; and
calculating a sum of the numbers of virtual cores of each operating VM to obtain the total number of virtual cores.

Preferably, the obtaining a number of allocatable physical cores in the target working node statistically includes:
obtaining the number of available physical cores in the target working node statistically;
obtaining a number of reserved physical cores in the target working node statistically; and
calculating a difference between the number of available physical cores and the number of reserved physical cores to obtain the number of allocatable physical cores.

Preferably, the performing CPU resource reservation configuration on the target working node by use of the available CPU quota includes:
performing CPU resource reservation configuration on each VM in the target working node by use of the available CPU quota.

In order to solve the foregoing technical problem, the present application also provides a CPU resource reservation apparatus, including:
a working node selection module, configured to select a target working node according to a received VM startup request;
a core number statistics module, configured to obtain the total number of virtual cores and the number of allocatable physical cores in the target working node statistically;
a core number calculation module, configured to perform calculation to obtain an available CPU quota according to the total number of virtual cores and the number of allocatable physical cores; and
a resource reservation configuration module, configured to perform CPU resource reservation configuration on the target working node by use of the available CPU quota.

In order to solve the foregoing technical problem, the present application also provides a CPU resource reservation device, including:
a memory, configured to store a computer program; and a processor, configured to execute the computer program to implement any steps of the above-mentioned CPU resource reservation method.

In order to solve the foregoing technical problem, the present application also provides a computer-readable memory medium, storing a computer program which is executed by a processor to implement any steps of the above-mentioned CPU resource reservation method.

The CPU resource reservation method provided in the present application includes: selecting a target working node according to a received VM startup request; obtaining a total number of virtual cores and a number of allocatable physical cores in the target working node statistically; performing calculation to obtain an available CPU quota according to the total number of virtual cores and the number of allocatable physical cores; and performing CPU resource reservation configuration on the target working node by use of the available CPU quota.

It can be seen that, according to the CPU resource reservation method provided in the present application, after the target working node is determined, the total number of virtual cores and the number of allocatable physical cores therein are obtained statistically, wherein the total number of virtual cores is the total number of virtual cores of all VMs in operation in the target working node, and the number of allocatable physical cores is the total number of freely allocatable physical cores in the target working node. Finally, calculation is performed to obtain the available CPU quota based on the two numbers, and CPU resource reservation configuration is performed on the target working node based on the available CPU quota. As such, CPU resource reservation is implemented according to a present operating state of the target working node. Compared with a common CPU binding mode, this implementation mode has the advantages that all VMs in the target working node are allowed to use a reserved CPU resource effectively, so that the flexibility is improved, and meanwhile, the complexity in CPU resource reservation is reduced.

All of the CPU resource reservation apparatus and device and computer-readable memory medium provided in the present application have the above-mentioned beneficial effects. Elaborations are omitted herein.

BRIEF DESCRIPTION OF THE DRAWINGS

In order to describe the technical solutions in the embodiments of the present application or the prior art more clearly, the drawings needed to be used in descriptions about the embodiments or the conventional art will be introduced simply below. Clearly, the drawings in the following descriptions are only the embodiments of the present application. Other drawings may further be obtained by those ordinarily skilled in the art according to the provided drawings without creative work.

DETAILED DESCRIPTION OF THE INVENTION

A core of the present application is to provide a CPU resource reservation method, which may implement performance evaluation on an Artificial Intelligence (AI) application more effectively and improves the performance evaluation efficiency while ensuring relatively high accuracy. Another core of the present application is to provide a CPU resource reservation apparatus and device and a computer-readable memory medium, which also have the above-mentioned beneficial effects.

In order to make the objectives, technical solutions, and advantages of the embodiments of the present application clearer, the technical solutions in the embodiments of the present application will be described clearly and completely below in combination with the drawings in the embodiments of the present application. Clearly, the described embodiments are not all but part of embodiments of the present application. All other embodiments obtained by those ordinarily skilled in the art based on the embodiments in the present application without creative work shall fall within the scope of protection of the present application.

Figure 1:
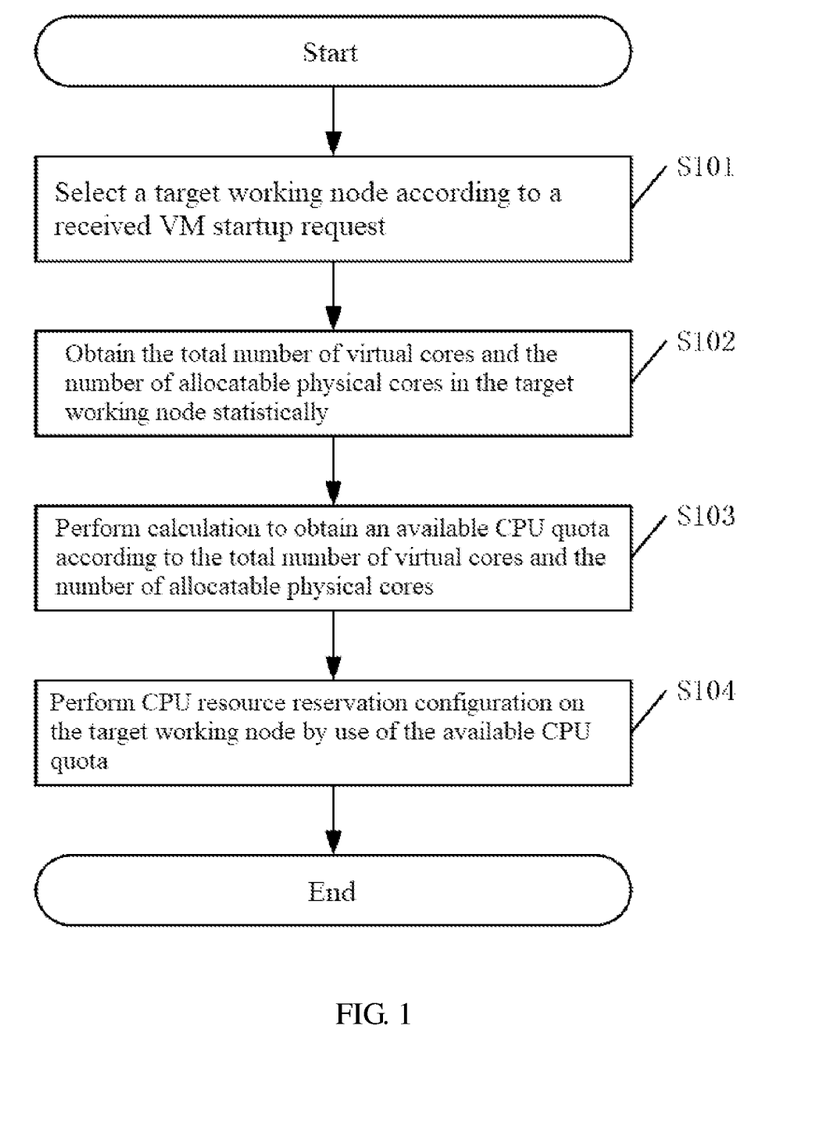
FIG. 1 is a flowchart of a CPU resource reservation method according to the present application.

Referring to FIG. 1, FIG. 1 is a flowchart of a CPU resource reservation method according to the present application. The CPU resource reservation method may include the following steps.

In S101, a target working node is selected according to a received VM startup request.

This step aims to implement the determination of the target working node. The target working node is a working node requiring CPU resource reservation configuration. The VM startup request is a request of starting up a VM. Specifically, a virtualization system mainly includes a control node, working nodes, and a shared storage pool. The control node is a central control node in the virtualization system, generally as well as an entry for a customer operation, and is configured to complete global resource management and scheduling. The working node is a node configured to operate a VM in the virtualization system, and may receive an instruction of the control node and execute a specific VM operation. The shared storage pool is a storage pool accessible for multiple working nodes at the same time, and is mainly configured to store service data of VMs, e.g., virtual disks. Therefore, when the control node receives the VM startup request, the target working node is selected and determined from many working nodes of the virtualization system.

Preferably, the operation that a target working node is selected according to a received VM startup request may include that: a preset node selection strategy is called in case that the VM startup request is received; and the target working node is selected from all working nodes according to the preset node selection strategy.

The present preferred embodiment provides a relatively specific method for selecting the target working node, namely selecting based on a preset node selection strategy. Specifically, a node selection strategy may be pre-established and stored in a preset storage space for calling. Therefore, when the VM startup request is received, the preset node selection strategy is called immediately, and the target working node is selected by use of the preset node selection strategy. A specific content of the preset node selection strategy is preset non-uniquely by a technician according to an actual situation as long as the target working node may be selected. No limits are made thereto in the present application.

Preferably, the preset node selection strategy may be a load balancing strategy.

The present preferred embodiment provides a preset node selection strategy of a specific type, i.e., a load-balancing strategy. That is, the target working node is determined according to a present load condition of each working node. Certainly, the selection strategy is non-unique but only an implementation mode provided in the preferred embodiment of the present application, and for example, may also be a focus strategy or a positive-negative association strategy.

Preferably, before the operation that the target working node is selected from all working nodes according to the preset node selection strategy, the method may further include that: each working node is sequenced according to a sequence from low to high CPU usages.

The present preferred embodiment provides a more specific method for selecting the target working node. Specifically, before the target working node is selected by use of the preset node selection strategy, each working node may be sequenced first, namely sequenced according to a sequence from low to high CPU usages, and then the target working node is selected and determined from all the sequenced working nodes. Therefore, the efficiency of selecting the target working node is improved effectively.

In S102, the total number of virtual cores and the number of allocatable physical cores in the target working node are obtained statistically.

This step aims to implement the statistical acquisition of the total number of virtual cores and the number of allocatable physical cores in the target working node. The total number of virtual cores is the total number of virtual cores of all VMs in operation in the target working node. The number of allocatable physical cores is the total number of freely allocatable physical cores in the target working node.

Preferably, the operation that the total number of virtual cores in the target working node is obtained statistically may include that: an operating VM in operation in the target working node is determined; the number of virtual cores of each operating VM is obtained statistically; and a sum of the numbers of virtual cores of each VM is calculated to obtain the total number of virtual cores.

The present preferred embodiment provides a relatively specific method for calculating the total number of virtual cores. Specifically, each VM in operation, i.e., the above-mentioned operating VM, in the target working node is determined first. Furthermore, virtual cores in each operating VM are counted to obtain the above-mentioned number of virtual cores. Finally, the numbers of virtual cores of each operating VM are summed, namely the numbers of virtual cores in each operating VM are added, so as to obtain the total number of virtual cores.

Preferably, the operation that the number of allocatable physical cores in the target working node is obtained statistically may include that: the number of available physical cores in the target working node is obtained statistically; the number of reserved physical cores in the target working node is obtained statistically; and a difference between the number of available physical cores and the number of reserved physical cores is calculated to obtain the number of allocatable physical cores.

The present preferred embodiment provides a relatively specific method for calculating the number of allocatable physical cores. Specifically, available physical cores, i.e., idle physical cores, in the target working node are counted first to obtain the number of available physical cores. Reserved physical cores in the target working node are counted to obtain the number of reserved physical cores, wherein the reserved physical core corresponds to a physical core requested to be reserved for a VM. Finally, the number of reserved physical cores is subtracted from the number of available physical cores so as to obtain the number of allocatable physical cores.

In S103, calculation is performed to obtain an available CPU quota according to the total number of virtual cores and the number of allocatable physical cores.

In S104, CPU resource reservation configuration is performed on the target working node by use of the available CPU quota.

The above step aims to implement CPU resource reservation configuration, specifically by use of a CPU resource reservation factor, i.e., the above-mentioned available CPU quota, obtained by performing calculation based on the total number of virtual cores and the number of allocatable physical cores. As such, an available CPU quota for a VM is set to control a CPU resource upper limit available for the VM, which is equivalent to regulating a resource reservation degree elastically according to a situation of a VM system. Therefore, the balance between the flexibility and the reservation effectiveness is ensured. Hereto, CPU resource reservation configuration is completed.

Preferably, the operation that CPU resource reservation configuration is performed on the target working node by use of the available CPU quota may include that: CPU resource reservation configuration is performed on each VM in the target working node by use of the available CPU quota.

Specifically, performing CPU resource reservation configuration on the target working node means performing CPU resource reservation configuration on each VM in the target working node, thereby configuring a CPU resource upper limit available for each VM.

According to the CPU resource reservation method provided in the present application, after the target working node is determined, the total number of virtual cores and the number of allocatable physical cores therein are obtained statistically, wherein the total number of virtual cores is the total number of virtual cores of all VMs in operation in the target working node, and the number of allocatable physical cores is the total number of freely allocatable physical cores in the target working node. Finally, calculation is performed to obtain the available CPU quota based on the two numbers, and CPU resource reservation configuration is performed on the target working node based on the available CPU quota. As such, CPU resource reservation is implemented according to a present operating state of the target working node. Compared with a common CPU binding mode, this implementation mode has the advantages that all VMs in the target working node are allowed to use a reserved CPU resource effectively, so that the flexibility is improved, and meanwhile, the complexity in CPU resource reservation is reduced.

Based on each of the above-mentioned embodiments, an embodiment of the present application provides a more specific CPU resource reservation method.

Figure 2:
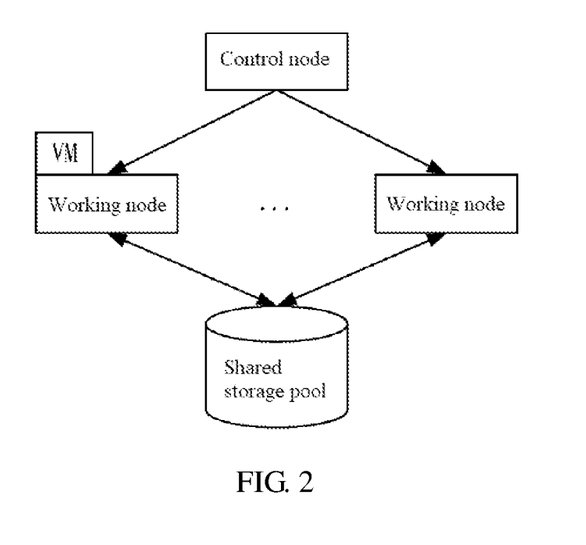
FIG. 2 is a schematic structural diagram of a server virtualization system according to the present application.

Referring to FIG. 2, FIG. 2 is a schematic structural diagram of a server virtualization system according to the present application, and a node composition and VM startup process of a present mainstream server virtualization system are shown. First, a control node selects a proper working node (target working node) according to a set strategy (preset node selection strategy). Then, an instruction is given to the working node to start up a VM. Meanwhile, a CPU resource reservation mechanism is added to an existing VM startup process, and a CPU resource reservation factor is introduced to obtain CPUQuota (available CPU quota) by calculation, thereby regulating a resource reservation degree elastically according to a situation of the system and ensuring the balance between the flexibility and the reservation effectiveness. For example, CPUQuota=50% represents that a resource upper limit for a present process (or VM) is a half of calculation power of physical cores, and CPUQuota=200% represents that a resource upper limit for the present process (or VM) is double calculation power of physical cores.

First, for ease of description of the solution, the following definitions are made:

pCPU: it represents the number of physical cores available for an operating VM in a working node;

vCPU (VMj): it represents the number of virtual cores requested by a $j^{th}$ VM operating in a working node;

rCPU (VMj): it represents the number of reserved physical cores requested by a $j^{th}$ VM operating in a working node; and rCPU: it represents the number of all reserved physical cores for a VM in operation in a working node, and rCPU<=pCPU It can be seen that a CPU resource requested by a VM may be represented as two parts, i.e., the number of non-reserved virtual cores and the number of reserved physical cores, represented as VM (v, r).

Furthermore, concepts of reservation factors are defined as follows:

K: it is a CPU resource reservation factor of the virtualization system with a value range of [0%, 100%], wherein a usage of a reserved CPU resource is regarded as 100% in the present application, so as to satisfy resource reservation; and R: it is a CPU resource reservation ratio of a working node, defined as a ratio of the number of logically reserved physical cores to the number of available physical cores: K*rCPU/pCPU.

In such case, a CPU usage of a node after resource reservation is an average value between "a non-reserved physical core usage" and "a reserved physical core usage". However, during practical implementation, a CPU usage of a working node is defined as: Usage=monitored average CPU usage of the system*(1−R)+R.

It can be seen that, if more physical cores are reserved, a CPU usage of a working node is higher, and the probability that the working node is selected is lower under a selection strategy of the control node.

Based on the above definitions, a specific implementation process of the CPU resource reservation method provided in the embodiment of the present application is as follows.

At 1, a control node selects a working node.

The control node sequences all available working nodes from low to high usages, and then selects a specific working node in combination with another strategy.

At 2, CPU resource allocation is performed on the working node.

(1) The number of virtual cores in the working node, i.e., a sum of the numbers of virtual cores of all VMs in operation (total number of virtual cores), is calculated:

vCPU=ΣvCPU(VMj).

(2) The number of freely allocatable physical cores (the number of allocatable physical cores) in the working node is calculated:

fpCPU=pCPU−K*rCPU.

(3) For any VM (v, r), an available CPU quota CPUQuota is calculated and set:

$$CPUQuota = \frac{v * fpCPU}{vCPU} + K * r_o$$

Hereto, CPU resource reservation is completed.

Furthermore, a specific method for implementing CPU resource allocation of a working node will be described below with a specific example. For example, a 32-Core (32C) physical server is set to implement hypervisor operation with 6C, and then the number of available physical cores is pCPU=26. It is assumed that four VMs are in operation thereon, i.e., A (4, 4,), B (8, 0), C (12, 4), and D (16, 0) respectively. That is, 8 cores and 4 cores are requested and reserved respectively for VM A, 8 cores are requested for VM B, 16 cores and 4 cores are requested and reserved respectively for VM C, and 16 cores are requested for VM D. Therefore, for the working node, rCPU=8. Meanwhile, K=100% is set. Then, a calculation process is as follows.

(1) The number of virtual cores in the working node is: vCPU=4+8+12+16=40.

(2) The number of freely allocatable physical cores in the working node is:

fpCPU=26−8=18.

(3) CPU resource reservation configuration is performed on each VM:

VM A: CPUQuota=4×18/40+4=580%;
VM B: CPUQuota=8×18/40=360%;
VM C: CPUQuota=12×18/40+4=940%; and
VM D: CPUQuota=16×18/40=720%.

It can be seen that, according to the CPU resource reservation method provided in the embodiment of the present application, after the target working node is determined, the total number of virtual cores and the number of allocatable physical cores therein are obtained statistically, wherein the total number of virtual cores is the total number of virtual cores of all VMs in operation in the target working node, and the number of allocatable physical cores is the total number of freely allocatable physical cores in the target working node. Finally, calculation is performed to obtain the available CPU quota based on the two numbers, and CPU resource reservation configuration is performed on the target working node based on the available CPU quota. As such, CPU resource reservation is implemented according to a present operating state of the target working node. Compared with a common CPU binding mode, this implementation mode has the advantages that all VMs in the target working node are allowed to use a reserved CPU resource effectively, so that the flexibility is improved, and meanwhile, the complexity in CPU resource reservation is reduced.

Figure 3:
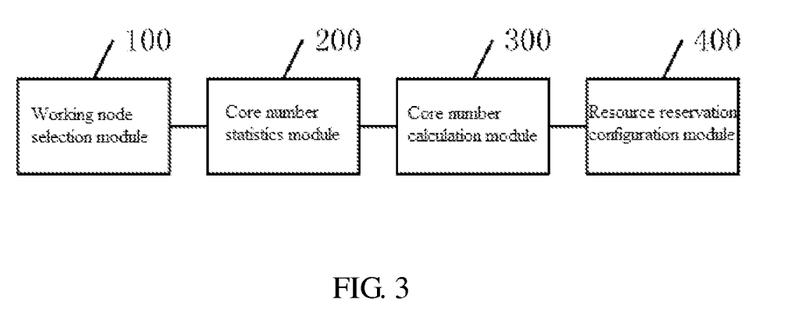
FIG. 3 is a schematic structural diagram of a CPU resource reservation apparatus according to the present application.

In order to solve the foregoing problem, referring to FIG. 3, FIG. 3 is a schematic structural diagram of a CPU resource reservation apparatus according to the present application. The CPU resource reservation apparatus may include:

a working node selection module 100, configured to select a target working node according to a received VM startup request;

a core number statistics module 200, configured to obtain the total number of virtual cores and the number of allocatable physical cores in the target working node statistically;

a core number calculation module 300, configured to perform calculation to obtain an available CPU quota according to the total number of virtual cores and the number of allocatable physical cores; and a resource reservation configuration module 400, configured to perform CPU resource reservation configuration on the target working node by use of the available CPU quota.

It can be seen that, according to the CPU resource reservation apparatus provided in the embodiment of the present application, after the target working node is determined, the total number of virtual cores and the number of allocatable physical cores therein are obtained statistically, wherein the total number of virtual cores is the total number of virtual cores of all VMs in operation in the target working node, and the number of allocatable physical cores is the total number of freely allocatable physical cores in the target working node. Finally, calculation is performed to obtain the available CPU quota based on the two numbers, and CPU resource reservation configuration is performed on the target working node based on the available CPU quota. As such, CPU resource reservation is implemented according to a present operating state of the target working node. Compared with a common CPU binding mode, this implementation mode has the advantages that all VMs in the target working node are allowed to use a reserved CPU resource effectively, so that the flexibility is improved, and meanwhile, the complexity in CPU resource reservation is reduced.

As a preferred embodiment, the working node selection module 100 may include:
  a strategy calling unit, configured to call a preset node selection strategy in case that the VM startup request is received; and
  a node selection unit, configured to select the target working node from all working nodes according to the preset node selection strategy.

As a preferred embodiment, the working node selection module 100 may further include a node sequencing unit, configured to, before the target working node is selected from all working nodes according to the preset node selection strategy, sequence each working node according to a sequence from low to high CPU usages.

As a preferred embodiment, the core number statistics module 200 may include:
  a VM determination unit, configured to determine an operating VM in operation in the target working node;
  a VM statistics unit, configured to obtain the number of virtual cores of each operating VM statistically; and
  a sum calculation unit, configured to calculate a sum of the numbers of virtual cores of each operating VM to obtain the total number of virtual cores.

As a preferred embodiment, the core number statistics module 200 may include:
  a first statistics unit, configured to obtain the number of available physical cores in the target working node statistically;
  a second statistics unit, configured to obtain the number of reserved physical cores in the target working node statistically; and
  a difference calculation unit, configured to calculate a difference between the number of available physical cores and the number of reserved physical cores to obtain the number of allocatable physical cores.

As a preferred embodiment, the resource reservation configuration module 400 may specifically be configured to perform CPU resource reservation configuration on each VM in the target working node by use of the available CPU quota.

Introductions about the apparatus provided in the present application refer to the method embodiment, and elaborations are omitted in the present application.

Figure 4:
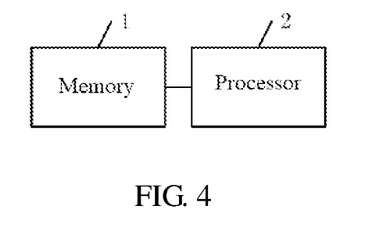
FIG. 4 is a schematic structural diagram of a CPU resource reservation device according to the present application.

In order to solve the foregoing problem, referring to FIG. 4, FIG. 4 is a schematic structural diagram of a CPU resource reservation device according to the present application. The CPU resource reservation device may include:
  a memory 1, configured to store a computer program; and
  processor 2, configured to execute the computer program to implement any steps of the above-mentioned CPU resource reservation method.

Introductions about the device provided in the present application refer to the method embodiment, and elaborations are omitted in the present application.

In order to solve the foregoing problem, the present application also provides a computer-readable memory medium, storing a computer program which is executed by a processor to implement any steps of the above-mentioned CPU resource reservation method.

The computer-readable memory medium may include various media capable of storing program codes such as a U disk, a mobile hard disk, a Read-Only Memory (ROM), a Random Access Memory (RAM), a magnetic disk, or an optical disk.

Introductions about the computer-readable memory medium provided in the present application refer to the method embodiment, and elaborations are omitted in the present application.

Each embodiment in the specification is described progressively. Descriptions made in each embodiment focus on differences from the other embodiments, and the same or similar parts in each embodiment refer to the other embodiments. The apparatus disclosed in the embodiments corresponds to the method disclosed in the embodiments, and thus is described relatively simply, and related parts refer to part of descriptions about the method.

Professionals may further realize that the units and algorithm steps of each example described in combination with the embodiments disclosed herein may be implemented by electronic hardware, computer software, or a combination thereof. In order to describe the interchangeability of hardware and software clearly, the compositions and steps of each example have been generally described in the foregoing descriptions according to functions. Whether these functions are executed by hardware or software depends on specific applications and design constraints of the technical solutions. Professionals may realize the described functions for each specific application by use of different methods, but such realization shall fall within the scope of the present application.

The steps of the method or algorithm described in combination with the embodiments disclosed herein may directly be implemented by hardware, a software module executed by the processor, or a combination thereof. The software module may be arranged in a RAM, a memory, a ROM, an electrically programmable ROM, an electrically erasable programmable ROM, a register, a hard disk, a mobile disk, a Compact Disc Read-Only Memory (CD-ROM), or a memory medium in any form well known in this art.

The CPU resource reservation method, apparatus, and device and computer-readable memory medium provided in the present application are introduced above in detail. The principle and implementation modes of the present application are described herein with specific examples, and the descriptions about the above embodiments are only for helping in understanding the method and core idea of the present application. It is to be pointed out that those ordinarily skilled in the art may further make a plurality of improvements and modifications to the present application without departing from the principle of the present application, and these improvements and modifications shall also fall within the scope of protection of the claims of the present application.

The invention claimed is:

1. A Central Processing Unit (CPU) resource reservation method, comprising:
    selecting a target working node according to a received Virtual Machine (VM) startup request;
    obtaining a total number of virtual cores and a number of allocatable physical cores in the target working node statistically;
    performing calculation to obtain an available CPU quota according to the total number of virtual cores and the number of allocatable physical cores; and
    performing CPU resource reservation configuration on the target working node by use of the available CPU quota;
    the total number of virtual cores is calculated according to a first mathematical formula:

$vCPU=\Sigma vCPU(VMj)$ wherein vCPU represents the total number of virtual cores, and vCPU(VMj) represents a number of virtual cores requested by a $j^{th}$ VM operating in a working node;
    the number of allocatable physical cores is calculated according to a second mathematical formula:

$fpCPU=pCPU-K*rCPU$ wherein fpCPU represents the number of allocatable physical cores, pCPU represents a number of physical cores available for an operating VM in the working node, rCPU represents a number of all reserved physical cores for the operating VM in the working node, rCPU≤pCPU, and K is a CPU resource reservation factor of a virtualization system with a value range of [0%, 100%];
    the available CPU quota is a ratio of a resource upper limit for a present VM to calculation power of physical cores, and for any VM (v, r), the available CPU quota is calculated according to a third mathematical formula:

$$CPUQuota = \frac{v * fpCPU}{vCPU} + K * r_o$$

wherein CPUQuota represents the available CPU quota, VM (v, r) represents a CPU resource requested by a VM, v is a number of non-reserved virtual cores, and r is a number of reserved physical cores.

2. The CPU resource reservation method of claim 1, wherein the selecting a target working node according to a received VM startup request comprises:
    calling a preset node selection strategy in case that the VM startup request is received; and
    selecting the target working node from all working nodes according to the preset node selection strategy.

3. The CPU resource reservation method of claim 2, wherein the preset node selection strategy is a load balancing strategy.

4. The CPU resource reservation method of claim 3, wherein the performing CPU resource reservation configuration on the target working node by use of the available CPU quota comprises:
    performing CPU resource reservation configuration on each VM in the target working node by use of the available CPU quota.

5. The CPU resource reservation method of claim 2, before the selecting the target working node from all working nodes according to the preset node selection strategy, further comprising:
    sequencing each working node according to a sequence from low to high CPU usages.

6. The CPU resource reservation method of claim 5, wherein the performing CPU resource reservation configuration on the target working node by use of the available CPU quota comprises:
    performing CPU resource reservation configuration on each VM in the target working node by use of the available CPU quota.

7. The CPU resource reservation method of claim 2, wherein the performing CPU resource reservation configuration on the target working node by use of the available CPU quota comprises:
    performing CPU resource reservation configuration on each VM in the target working node by use of the available CPU quota.

8. The CPU resource reservation method of claim 1, wherein the obtaining a total number of virtual cores in the target working node statistically comprises:
    determining an operating VM in operation in the target working node;
    obtaining a number of virtual cores of each operating VM statistically; and
    calculating a sum of the numbers of virtual cores of each operating VM to obtain the total number of virtual cores.

9. The CPU resource reservation method of claim 8, wherein the performing CPU resource reservation configuration on the target working node by use of the available CPU quota comprises:
    performing CPU resource reservation configuration on each VM in the target working node by use of the available CPU quota.

10. The CPU resource reservation method of claim 1, wherein the obtaining a number of allocatable physical cores in the target working node statistically comprises:
    obtaining a number of available physical cores in the target working node statistically;
    obtaining a number of reserved physical cores in the target working node statistically; and
    calculating a difference between the number of available physical cores and the number of reserved physical cores to obtain the number of allocatable physical cores.

11. The CPU resource reservation method of claim 10, wherein the performing CPU resource reservation configuration on the target working node by use of the available CPU quota comprises:
    performing CPU resource reservation configuration on each VM in the target working node by use of the available CPU quota.

12. The CPU resource reservation method of claim 1, wherein the performing CPU resource reservation configuration on the target working node by use of the available CPU quota comprises:
    performing CPU resource reservation configuration on each VM in the target working node by use of the available CPU quota.

13. A Central Processing Unit (CPU) resource reservation device, comprising:
    a memory, configured to store a computer program; and
    a processor, configured to execute the computer program to implement steps of:

selecting a target working node according to a received Virtual Machine (VM) startup request;

obtaining a total number of virtual cores and a number of allocatable physical cores in the target working node statistically;

performing calculation to obtain an available CPU quota according to the total number of virtual cores and the number of allocatable physical cores; and performing CPU resource reservation configuration on the target working node by use of the available CPU quota;

the total number of virtual cores is calculated according to a first mathematical formula:

$$vCPU=\Sigma vCPU(VMj)$$

wherein vCPU represents the total number of virtual cores, and vCPU(VMj) represents a number of virtual cores requested by a $j^{th}$ VM operating in a working node;

the number of allocatable physical cores is calculated according to a second mathematical formula:

$$fpCPU=pCPU-K*rCPU$$

wherein fpCPU represents the number of allocatable physical cores, pCPU represents a number of physical cores available for an operating VM in the working node, rCPU represents a number of all reserved physical cores for the operating VM in the working node, rCPU≤pCPU, and K is a CPU resource reservation factor of a virtualization system with a value range of [0%, 100%];

the available CPU quota is a ratio of a resource upper limit for a present VM to calculation power of physical cores, and for any VM (v, r), the available CPU quota is calculated according to a third mathematical formula:

$$CPUQuota = \frac{v*fpCPU}{vCPU} + K*r_o$$

wherein CPUQuota represents the available CPU quota, VM (v, r) represents a CPU resource requested by a VM, v is a number of non-reserved virtual cores, and r is a number of reserved physical cores.

14. The CPU resource reservation device of claim 13, wherein the device, when executing the computer program to select the target working node according to the received VM startup request, is further configured to execute the computer program to implement steps of:

calling a preset node selection strategy in case that the VM startup request is received, wherein the preset node selection strategy is a load balancing strategy; and selecting the target working node from all working nodes according to the preset node selection strategy, by virtue of sequencing each working node according to a sequence from low to high CPU usages.

15. The CPU resource reservation device of claim 13, wherein the device, when executing the computer program to obtain the total number of virtual cores and the number of allocatable physical cores in the target working node statistically, is further configured to execute the computer program to implement steps of:

determining an operating VM in operation in the target working node;

obtaining a number of virtual cores of each operating VM statistically; and calculating a sum of the numbers of virtual cores of each operating VM to obtain the total number of virtual cores;

or obtaining a number of available physical cores in the target working node statistically;

obtaining a number of reserved physical cores in the target working node statistically; and calculating a difference between the number of available physical cores and the number of reserved physical cores to obtain the number of allocatable physical cores.

16. The CPU resource reservation device of claim 13, wherein the device, when executing the computer program to perform CPU resource reservation configuration on the target working node by use of the available CPU quota, is further configured to execute the computer program to implement a step of:

performing CPU resource reservation configuration on each VM in the target working node by use of the available CPU quota.

17. A non-transitory computer-readable memory medium, storing a computer program which is executed by a processor to implement steps of:

selecting a target working node according to a received Virtual Machine (VM) startup request;

obtaining a total number of virtual cores and a number of allocatable physical cores in the target working node statistically;

performing calculation to obtain an available Central Processing Unit (CPU) quota according to the total number of virtual cores and the number of allocatable physical cores; and performing CPU resource reservation configuration on the target working node by use of the available CPU quota;

the total number of virtual cores is calculated according to a first mathematical formula:

$$vCPU=\Sigma vCPU(VMj)$$

wherein vCPU represents the total number of virtual cores, and vCPU(VMj) represents a number of virtual cores requested by a $j^{th}$ VM operating in a working node;

the number of allocatable physical cores is calculated according to a second mathematical formula:

$$fpCPU=pCPU-K*rCPU$$

wherein fpCPU represents the number of allocatable physical cores, pCPU represents a number of physical cores available for an operating VM in the working node, rCPU represents a number of all reserved physical cores for the operating VM in the working node, rCPU≤pCPU, and K is a CPU resource reservation factor of a virtualization system with a value range of [0%, 100%];

the available CPU quota is a ratio of a resource upper limit for a present VM to calculation power of physical cores, and for any VM (v, r), the available CPU quota is calculated according to a third mathematical formula:

$$CPUQuota = \frac{v*fpCPU}{vCPU} + K*r_o$$

wherein CPUQuota represents the available CPU quota, VM (v, r) represents a CPU resource requested by a VM, v is a number of non-reserved virtual cores, and r is a number of reserved physical cores.

18. The non-transitory computer-readable memory medium of claim 17, wherein the computer program which is executed by the processor to select the target working node according to the received VM startup request, further implements steps of:
calling a preset node selection strategy in case that the VM startup request is received, wherein the preset node selection strategy is a load balancing strategy; and
selecting the target working node from all working nodes according to the preset node selection strategy, by virtue of sequencing each working node according to a sequence from low to high CPU usages.

19. The non-transitory computer-readable memory medium of claim 17, wherein the computer program which is executed by the processor to obtain the total number of virtual cores and the number of allocatable physical cores in the target working node statistically, further implements steps of:
determining an operating VM in operation in the target working node;
obtaining a number of virtual cores of each operating VM statistically; and
calculating a sum of the numbers of virtual cores of each operating VM to obtain the total number of virtual cores;
or
obtaining a number of available physical cores in the target working node statistically;
obtaining a number of reserved physical cores in the target working node statistically; and
calculating a difference between the number of available physical cores and the number of reserved physical cores to obtain the number of allocatable physical cores.

20. The non-transitory computer-readable memory medium of claim 17, wherein the computer program which is executed by the processor to perform CPU resource reservation configuration on the target working node by use of the available CPU quota, further implements a step of:
performing CPU resource reservation configuration on each VM in the target working node by use of the available CPU quota.

* * * * *